US010449807B2

(12) United States Patent
Mukai

(10) Patent No.: US 10,449,807 B2
(45) Date of Patent: Oct. 22, 2019

(54) PNEUMATIC TIRE

(71) Applicant: SUMITOMO RUBBER INDUSTRIES LTD., Kobe-shi (JP)

(72) Inventor: Yu Mukai, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 796 days.

(21) Appl. No.: 14/949,951

(22) Filed: Nov. 24, 2015

(65) Prior Publication Data

US 2016/0185160 A1 Jun. 30, 2016

(30) Foreign Application Priority Data

Dec. 26, 2014 (JP) ................................ 2014-265965

(51) Int. Cl.
*B60C 11/04* (2006.01)
*B60C 11/12* (2006.01)
*B60C 11/03* (2006.01)
*B60C 11/13* (2006.01)

(52) U.S. Cl.
CPC ...... *B60C 11/0327* (2013.01); *B60C 11/0306* (2013.01); *B60C 11/04* (2013.01);
(Continued)

(58) Field of Classification Search
CPC ................. B60C 11/04; B60C 11/1307; B60C 2011/0381; B60C 2011/0383;
(Continued)

(56) References Cited

U.S. PATENT DOCUMENTS

2002/0092591 A1\* 7/2002 Cortes ................. B60C 11/0309
  152/209.18
2009/0255614 A1  10/2009 Ebiko
(Continued)

FOREIGN PATENT DOCUMENTS

| JP | 09-226323 A | \* | 9/1997 |
|---|---|---|---|
| JP | 2003-182315 A | \* | 7/2003 |
| JP | 2010-179887 A | \* | 8/2010 |
| JP | 2012-162194 A | | 8/2012 |
| JP | 2013-039899 A | \* | 2/2013 |
| JP | 2013-193464 | | 9/2013 |

OTHER PUBLICATIONS

Machine translation for Japan 2013-039899 (Year: 2018).\*
(Continued)

*Primary Examiner* — Steven D Maki
(74) *Attorney, Agent, or Firm* — Oblon, McClelland, Maier & Neustadt, L.L.P.

(57) ABSTRACT

A pneumatic tire includes a tread having a shoulder main groove, a center main groove formed adjacent to the shoulder main groove, a shoulder land section on tire axially outer side of the shoulder main groove, and a middle land section bordered by the shoulder and center main grooves. The shoulder land section has a shoulder lug groove and a shoulder linked sipe connecting the end of the shoulder lug groove and the shoulder main groove, the middle land section has a middle lug groove and a middle linked sipe connecting the end of the middle lug groove and the center main groove, and the shoulder lug groove, the shoulder linked sipe and the middle lug groove are formed on an inclined curve extending smoothly from the tread edge in the axially inward direction, and the middle linked sipe is inclining in direction opposite with respect to the inclined curve.

20 Claims, 7 Drawing Sheets

(52) U.S. Cl.
CPC ...... *B60C 11/1236* (2013.01); *B60C 11/1307* (2013.01); *B60C 2011/0334* (2013.01); *B60C 2011/0341* (2013.01); *B60C 2011/0365* (2013.01); *B60C 2011/0367* (2013.01); *B60C 2011/0369* (2013.01); *B60C 2011/0372* (2013.01); *B60C 2011/0381* (2013.01); *B60C 2011/0383* (2013.01); *B60C 2011/0388* (2013.01); *B60C 2011/0395* (2013.01); *B60C 2011/1209* (2013.01)

(58) Field of Classification Search
CPC ..... B60C 2011/1209; B60C 2011/0365; B60C 2011/0369; B60C 2011/0376; B60C 2011/0379
See application file for complete search history.

(56) References Cited

U.S. PATENT DOCUMENTS

2010/0314012 A1* 12/2010 Hada .................. B60C 11/0306
152/209.16
2015/0151588 A1 6/2015 Munezawa

OTHER PUBLICATIONS

Machine translation for Japan 2010-179887 (Year: 2018).*
Machine translation for Japan 2003-182315 (Year: 2018).*
Machine translation for Japan 09-226323 (Year: 2018).*
Extended Search Report dated May 25, 2016 in European Patent Application No. 15196342.8.

* cited by examiner

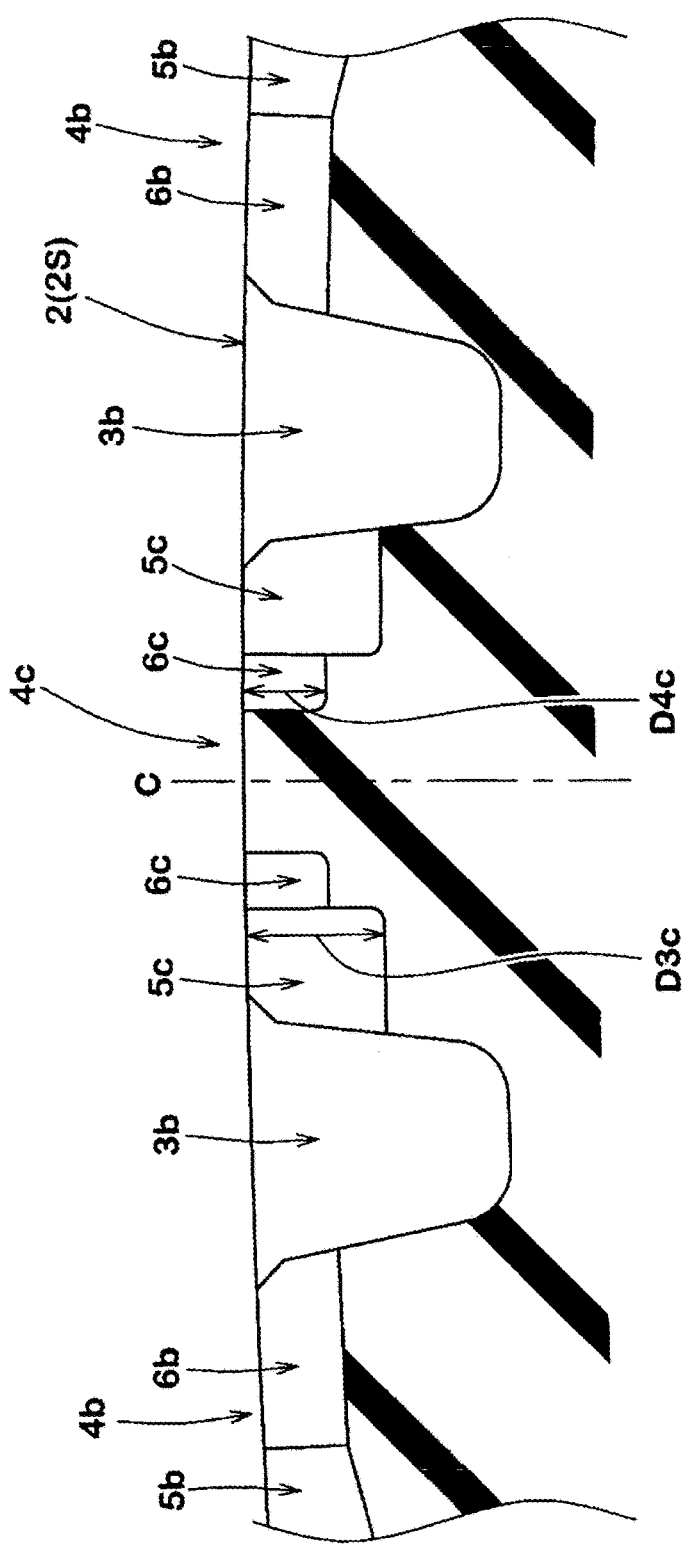

PNEUMATIC TIRE

CROSS-REFERENCE TO RELATED APPLICATIONS

The present application is based upon and claims the benefit of priority to Japanese Patent Application No. 2014-265965, filed Dec. 26, 2014, the entire contents of which are incorporated herein by reference.

BACKGROUND OF THE INVENTION

Field of the Invention

The present invention relates to a pneumatic tire that exhibits a highly balanced enhancement of steering stability and drainage capability.

Description of Background Art

JP2012-162194A describes a pneumatic tire in which a tread is provided with land sections bordered by multiple main grooves each continuously extending in a tire circumferential direction. The entire contents of this publication are incorporated herein by reference.

SUMMARY OF THE INVENTION

According to one aspect of the present invention, a pneumatic tire includes a tread having a shoulder main groove formed closest to a tread edge and extending continuously in a tire circumferential direction, a center main groove formed adjacent to the shoulder main groove on a tire axially inner side and extending continuously in the tire circumferential direction, a shoulder land section formed on a tire axially outer side of the shoulder main groove, and a middle land section bordered by the shoulder main groove and the center main groove. The shoulder land section has a shoulder lug groove extending from the tread edge in a tire axially inward direction and terminating at a tire axially inner end without reaching the shoulder main groove, and a shoulder linked sipe connecting the tire axially inner end of the shoulder lug groove and the shoulder main groove, the middle land section has a middle lug groove extending from the shoulder main groove in the tire axially inward direction and terminating at a tire axially inner end without reaching the center main groove, and a middle linked sipe connecting the tire axially inner end of the middle lug groove and the center main groove, the shoulder lug groove, the shoulder linked sipe and the middle lug groove are formed on an inclined curve extending smoothly from the tread edge in the tire axially inward direction, and the middle linked sipe is formed such that the middle linked sipe is inclining in a direction opposite with respect to the inclined curve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is an enlarged cross-sectional view of the center land section in FIG. 2;

DETAILED DESCRIPTION OF THE EMBODIMENTS

Figure 1:
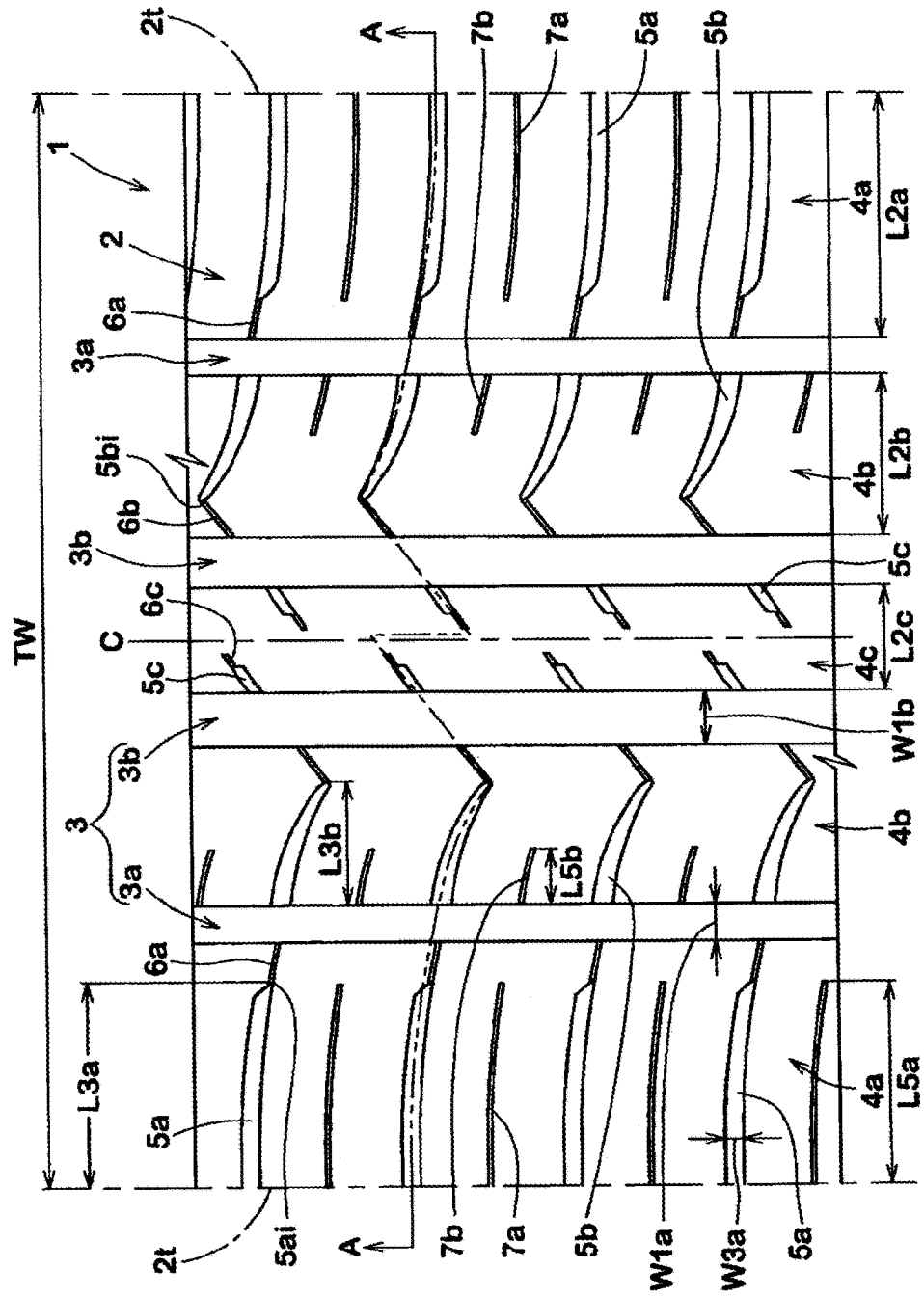
FIG. 1 is a developed view showing an example of the tread of a pneumatic tire according to an embodiment of the present invention.

The embodiments will now be described with reference to the accompanying drawings, wherein like reference numerals designate corresponding or identical elements throughout the various drawings.

Figure 2:
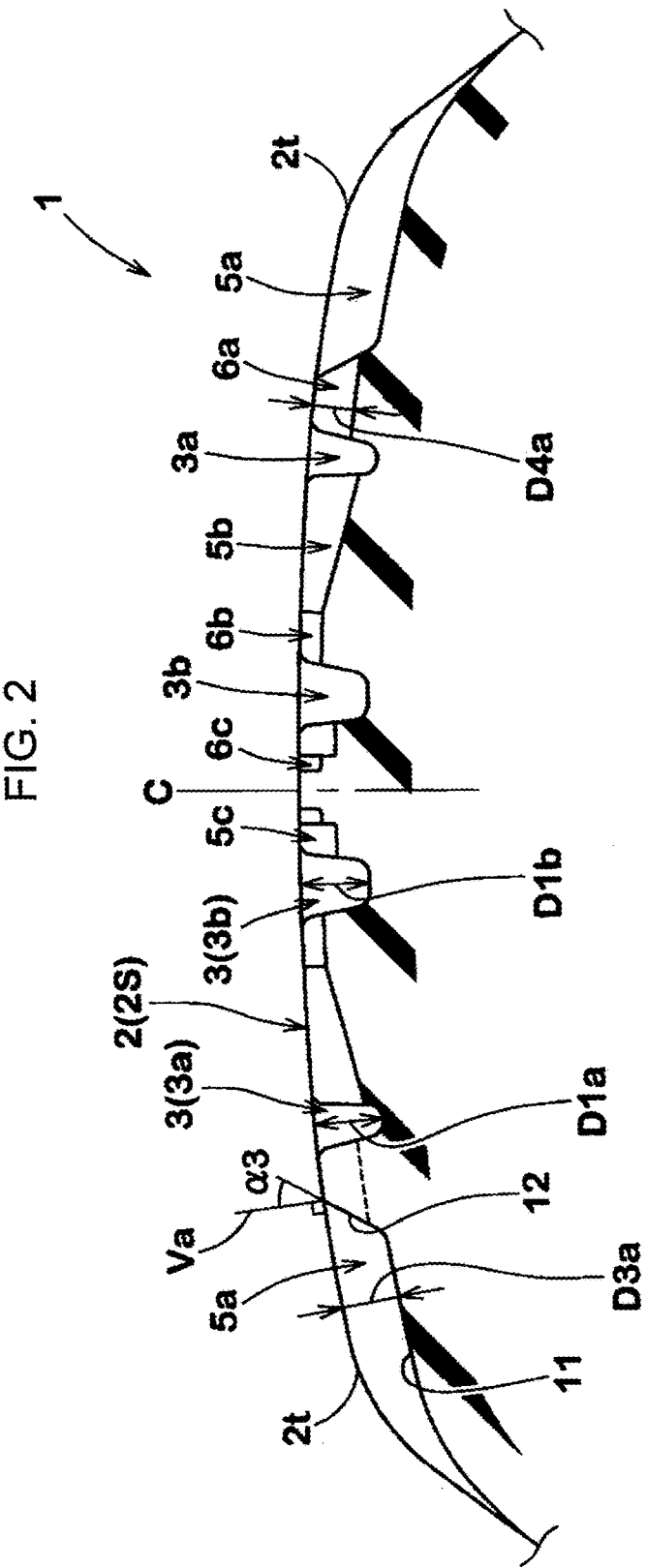
FIG. 2 is a cross-sectional view taken at the A-A line in FIG. 1.

FIG. 1 is a developed view showing an example of the tread of a pneumatic tire (hereinafter may be referred to simply as "tire") 1 of the present embodiment. FIG. 2 is a cross-sectional view taken at the A-A line in FIG. 1. Tire 1 of the present embodiment is structured to be mounted on a passenger car.

Tread 2 of the present embodiment has a pair of shoulder main grooves (3a, 3a) each positioned closest to tread edge (2t) and extending continuously in a tire circumferential direction, and a pair of center main grooves (3b, 3b) each positioned adjacent to shoulder main groove (3a) on the tire axially inner side and extending continuously in a tire circumferential direction. Paired center main grooves (3b, 3b) are each formed on either side of tire equator (C). Accordingly, a shoulder land section (4a) on the tire axially outer side of a shoulder main groove (3a), a middle land section (4b) positioned between the shoulder main groove (3a) and a center main groove (3b), and a center land section (4c) positioned between paired center main grooves (3b, 3b) are formed in tread 2. Tread 2 of the present embodiment has tread patterns that are symmetrical at any point on tire equator (C).

"Tread edge (2t)" is the edge when it is clearly recognized as an edge on the tread. When it is not recognizable, tread edge (2t) is determined to be a tire axially outermost contact-patch point when a normal load is exerted on tire 1 under normal conditions, that is, when the tire is mounted on a normal rim and filled with air at a normal inflation pressure with no load exerted thereon, and when tread 2 is brought into contact with a planar surface at a camber angle of zero degrees.

A "normal rim" indicates a rim specified for each tire by a regulatory system that includes standards for the tire: it is specified, for example, as a "Normal Rim" by JATMA, "Design Rim" by TRA, and "Measuring Rim" by ETRTO.

A "normal inflation pressure" indicates air pressure specified for each tire by the above regulatory system. It is specified as "Maximum Air Pressure" by JATMA, maximum value listed in a table "Tire Load Limits at Various Cold Inflation Pressures" by TRA, and "Inflation Pressure" by ETRTO. When tire 1 is for a passenger car, the normal inflation pressure is set at 180 kPa.

"Normal load" indicates the load specified for each tire by a regulatory system that includes standards for the tire. It is specified as "Maximum Load Capacity" by JATMA, maximum value listed in a table "Tire Load Limits at Various Cold Inflation Pressures" by TRA, and "Load Capacity" by ETRTO. When tire 1 is for a passenger car, the normal load is set at 88% of the above load.

Unless otherwise specified, measurements or the like of tire members are those obtained when the tire is under normal conditions described above.

Shoulder main groove (3a) and center main groove (3b) are formed as a straight-line groove extending straight in a tire circumferential direction. Since such straight grooves are capable of smoothly discharging the water between tread 2 and the ground surface away from the tire in a tire circumferential direction, drainage capability is enhanced. Groove widths (W1a, W1b) of shoulder main groove (3a) and center main groove (3b) respectively are preferred to be approximately 3.0%~8.0% of tread contact-patch width (TW), which is the tire axial distance between tread edges (2t, 2t). In addition, groove depths (D1a, D1b) of shoulder main groove (3a) and center main groove (3b) (shown in FIG. 2) respectively are preferred to be approximately 5.0~9.0 mm Groove width (W1b) of center main groove (3b) is set to be greater than groove width (W1a) of shoulder main groove (3a) in the present embodiment. Such a structure of center main groove (3b) contributes to effectively discharging water away from between tread 2 and the ground surface on the tire-equator (C) side where the contact-patch pressure is greater than other portions. To effectively exhibit such effects, groove width (W1b) of center main groove (3b) is preferred to be 110%~140% of groove width (W1a) of shoulder main groove (3a).

Figure 3:
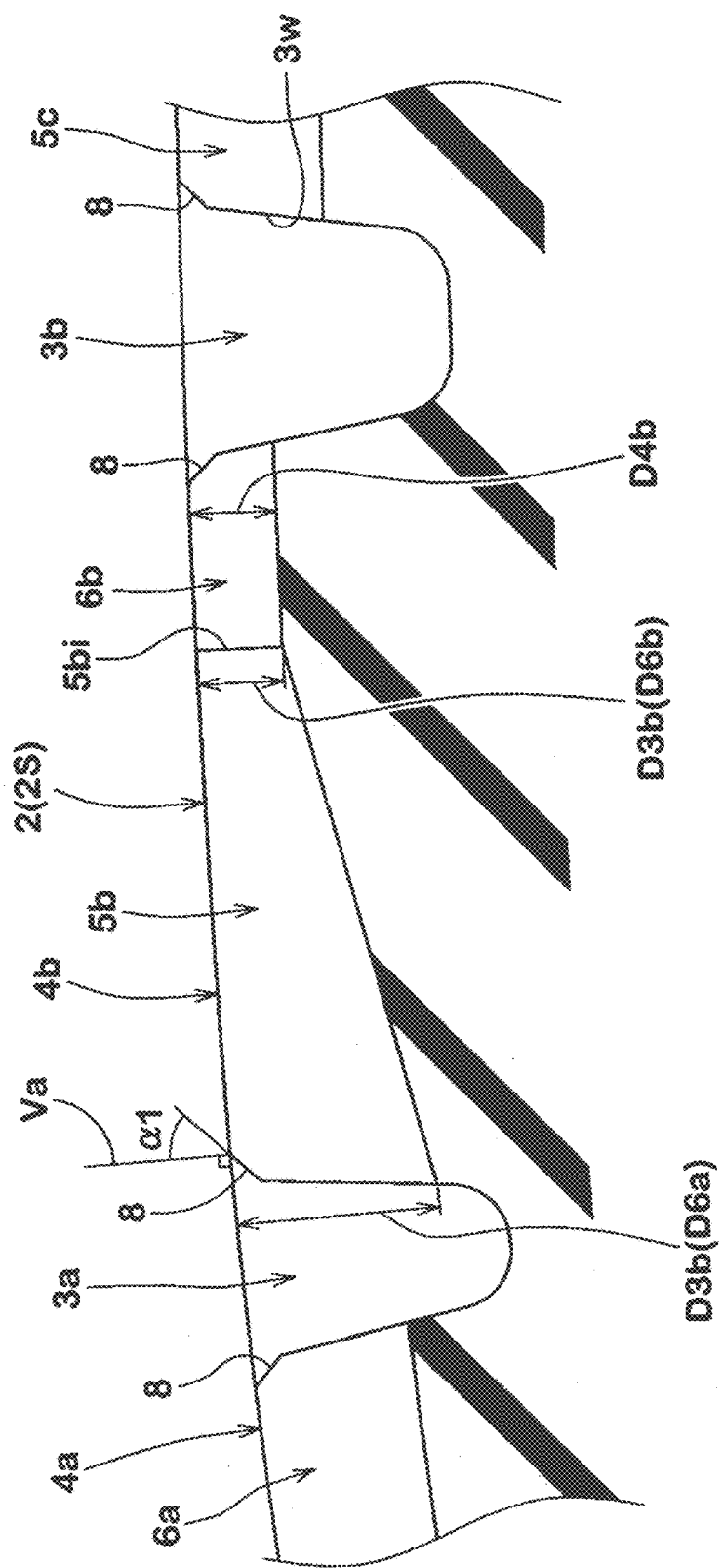
FIG. 3 is an enlarged view of a middle land section in FIG. 2.

FIG. 3 is an enlarged view of middle land section (4b) in FIG. 2. Shoulder main groove (3a) and center main groove (3b) are each preferred to have chamfered corner 8 at the external corner of contact patch (2s) of tread 2 and groove wall (3w). Chamfered corner 8 effectively prevents uneven wear and damage such as chipping that are likely to occur at the external corner of contact patch (2s) of tread 2 and groove wall (3w). Angle ($\alpha 1$) of chamfered corner 8 is preferred to be approximately 35~55 degrees relative to the tread normal line (Va) perpendicular to contact patch (2s).

As shown in FIG. 1, shoulder land section (4a) is provided with shoulder lug groove (5a) and shoulder linked sipe (6a). Shoulder land section (4a) of the present embodiment is further provided with shoulder auxiliary sipe (7a). Tire axial length (L2a) of shoulder land section (4a) is set at approximately 20%~25% of tread contact-patch width (TW).

Shoulder lug groove (5a) extends from tread edge (2t) in a tire axially inward direction and terminates without reaching shoulder main groove (3a). Such a structure of shoulder lug groove (5a) forms shoulder land section (4a) as a rib pattern having greater land rigidity, and thus steering stability is enhanced.

In the present embodiment, shoulder lug groove (5a) inclines while forming a smooth curve from tread edge (2t) toward shoulder main groove (3a). Such a structure of shoulder lug groove (5a) smoothly discharges water between tread 2 and the ground surface toward tread edge (2t), and contributes to enhancing drainage capability accordingly. Groove width (W3a) of shoulder lug groove (5a) is preferred to be approximately 1.5%~3.0% of tread contact-patch width (TW) (shown in FIG. 1). Groove depth (D3a) of shoulder lug groove (5a) (shown in FIG. 2) is preferred to be approximately 4.0~8.0 mm.

Tire axial length (L3a) of shoulder lug groove (5a) is preferred to be set at approximately 75%~85% of length (L2a) of shoulder land section (4a). A length (L3a) of shoulder lug groove (5a) exceeding 85% of length (L2a) of shoulder land section (4a) fails to sufficiently increase land rigidity of shoulder land section (4a), and steering stability may not be enhanced. On the other hand, a length (L3a) of shoulder lug groove (5a) at less than 75% of length (L2a) of shoulder land section (4a) fails to smoothly discharge water away from between tread 2 and the ground surface, and drainage capability may not be sufficiently enhanced. From those viewpoints, length (L3a) of shoulder lug groove (5a) is preferred to be no greater than 82% and at least 78% of length (L2a) of shoulder land section (4a).

In the present embodiment, tire axially inner end (5ai) of shoulder lug groove (5a) is formed to taper. Because of such a structure of shoulder lug groove (5a), rigidity in shoulder land section (4a) is distributed smoothly in a tire axial direction, and steering stability is thereby enhanced.

On a cross section obtained by cutting shoulder lug groove (5a) along the groove center line, inner groove wall 12 connecting groove bottom 11 of shoulder lug groove (5a) and contact patch (2S) of tread 2 is formed on the inner-end (5ai) side of shoulder lug groove (5a) as shown in FIG. 2. Inner groove wall 12 is preferred to be a gentle slope. Because of such a structure of inner groove wall 12, rigidity in shoulder land section (4a) is further smoothly distributed in a tire axial direction, and steering stability is thereby enhanced. Here, angle ($\alpha 3$) of inner groove wall 12 is preferred to be set at 30~40 degrees relative to tread normal line (Va) perpendicular to contact patch (2S).

As shown in FIG. 1, shoulder linked sipe (6a) connects tire axially inner end (5ai) of shoulder lug groove (5a) and shoulder main groove (3a). Tread edge (2t) and shoulder main groove (3a) are connected by shoulder linked sipe (6a) and shoulder lug groove (5a). As shown in FIG. 2, depth (D4a) of shoulder linked sipe (6a) is preferred to be approximately 50%~80% of groove depth (D1a) of shoulder main groove (3a).

Figure 4:
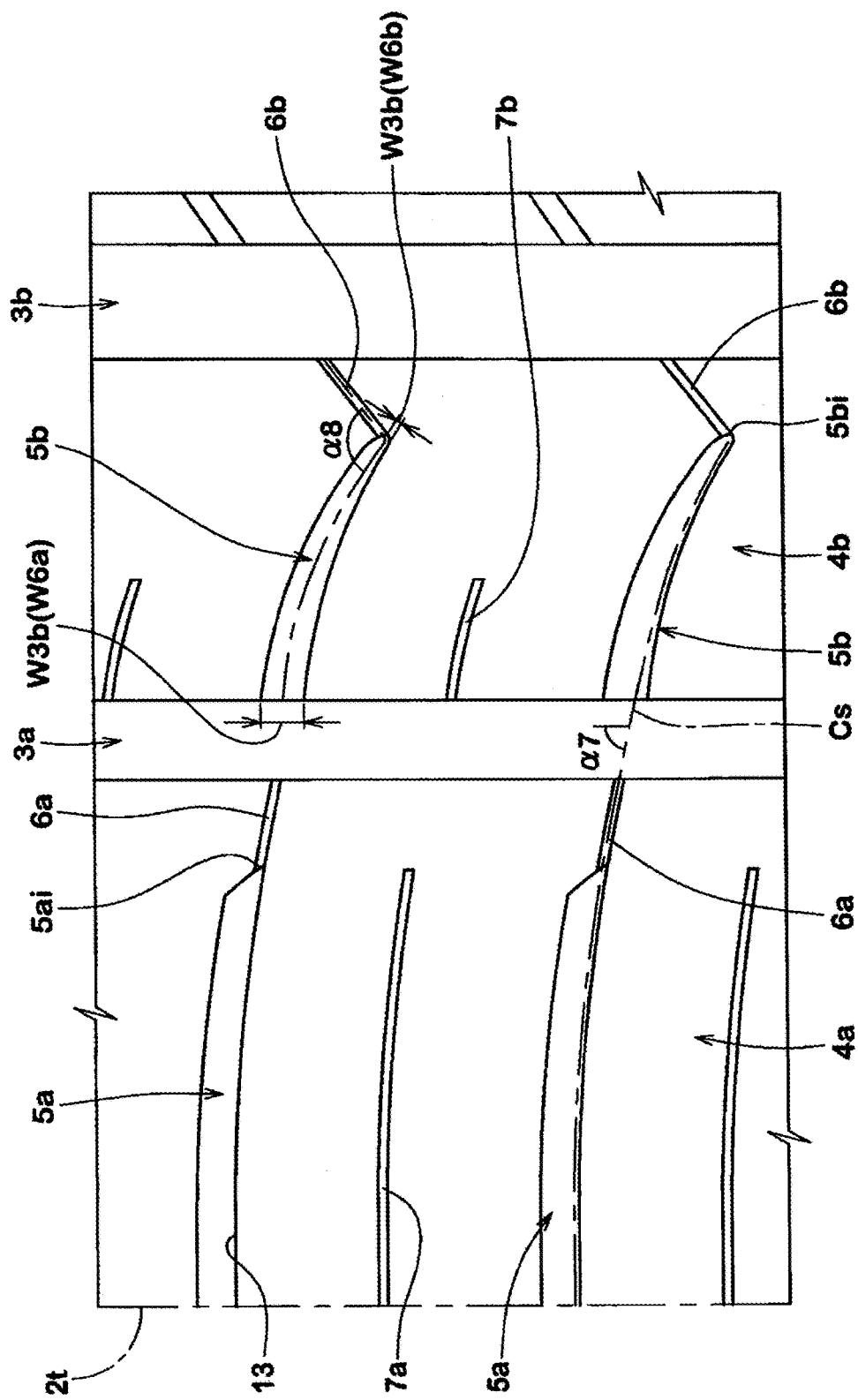
FIG. 4 is an enlarged view of a shoulder land section and a middle land section in FIG. 1.

FIG. 4 is an enlarged view of shoulder land section (4a) and middle land section (4b) in FIG. 1. Shoulder linked sipe (6a) inclines while it extends along tire circumferential groove periphery 13 of shoulder lug groove (5a). Such a structure of shoulder linked sipe (6a) contributes to the smooth discharge of water away from between tread 2 and the ground surface. In addition, since such a structure mitigates the rigidity between inner end (5ai) of shoulder lug groove (5a) and shoulder main groove (3a), rigidity in shoulder land section (4a) is distributed smoothly in a tire axial direction. Accordingly, steering stability is enhanced while uneven wear is prevented at inner end (5ai) of shoulder lug groove (5a).

As shown in FIG. 1, shoulder auxiliary sipe (7a) extends from tread edge (2t) in a tire axially inward direction and terminates without reaching shoulder main groove (3a). Such a structure of shoulder auxiliary sipe (7a) contributes to smoothly discharging water away from between tread 2 and the ground surface while preventing a decrease in the land rigidity of shoulder land section (4a). Accordingly, drainage capability is enhanced.

To effectively exhibit the above effects, shoulder auxiliary sipe (7a) is preferred to incline at the same angle as that of shoulder lug groove (5a). Moreover, tire axial length (L5a) of shoulder auxiliary sipe (7a) is preferred to be set approximately the same as length (L3a) of shoulder lug groove (5a). In addition, the depth (not shown) of shoulder auxiliary sipe (7a) is preferred to be approximately the same as depth (D4a) (shown in FIG. 2) of shoulder linked sipe (6a).

Middle land section (4b) is provided with middle lug groove (5b) and middle linked sipe (6b). Middle land section (4b) of the present embodiment is further provided with middle auxiliary sipe (7b). Tire axial length (L2b) of middle land section (4b) is set at, for example, approximately 13.0%~17.0% of tread contact-patch width (TW).

Middle lug groove (5b) extends from shoulder main groove (3a) in a tire axially inward direction and terminates without reaching center main groove (3b). Such a structure of middle lug groove (5b) forms middle land section (4b) in a rib pattern having greater land rigidity, and contributes to enhancing steering stability.

Middle lug groove (5b) of the present embodiment is inclined while making a smooth curve from shoulder main groove (3a) toward center main groove (3b). Such a structure of middle lug groove (5b) contributes to smoothly discharging water from between tread 2 and the ground surface toward shoulder main groove (3a), and enhancing drainage capability.

As shown in FIG. 4, groove width (W3b) of middle lug groove (5b) is preferred to increase gradually from inner end (5bi) of middle lug groove (5b) toward shoulder main groove (3a). By so setting, water between tread 2 and the ground surface is smoothly discharged from the inner-end (5bi) side having a smaller groove width (W3b) toward shoulder main groove (3a) having a greater groove width (W3b), and drainage capability is thereby enhanced. Groove width (W3b) on the inner-end (5bi) side of middle lug groove (5b) (minimum groove width (W6b)) is preferred to be approximately 25%~45% of groove width (W3b) on the shoulder main-groove (3a) side of middle lug groove (5b) (maximum groove width (W6a)).

As shown in FIG. 3, groove depth (D3b) of middle lug groove (5b) of the present embodiment is preferred to increase gradually from inner end (5bi) of middle lug groove (5b) toward shoulder main groove (3a). By so setting, water between tread 2 and the ground surface is smoothly discharged from the inner-end (5bi) side having a smaller groove depth (D3b) toward shoulder main groove (3a) having a greater groove depth (D3b). Groove depth (D3b) on the inner-end (5bi) side of middle lug groove (5b) (minimum groove depth (D6b)) is preferred to be approximately 25%~45% of groove depth (D3b) on the shoulder main-groove (3a) side of middle lug groove (5b) (maximum groove depth (D6a)).

As shown in FIG. 1, tire axial length (L3b) of middle lug groove (5b) may be set appropriately. If length (L3b) of middle lug groove (5b) is smaller, rigidity in middle land section (5b) may not be distributed smoothly in a tire axial direction, thus making it harder to enhance steering stability. On the other hand, if length (L3b) of middle lug groove (5b) is longer, the land rigidity of middle land section (4b) cannot be maintained, thus making it harder to enhance steering stability. From those viewpoints, length (L3b) of middle lug groove (5b) is preferred to be at least 75% but no greater than 85% of tire axial length (L2b) of middle land section (4b).

In the present embodiment, shoulder lug groove (5a), shoulder linked sipe (6a) and middle lug groove (5b) are formed on inclined curve (Cs) extending smoothly from tread edge (2t) in a tire axially inward direction as shown in FIG. 4. Here, "formed on smoothly extending inclined curve (Cs)" indicates inclined curve (Cs) is formed continuously to go smoothly through shoulder lug groove (5a), shoulder linked sipe (6a) and middle lug groove (5b) (including their groove peripheries). The curvature radius of inclined curve (Cs) may be set appropriately. The curvature radius of inclined curve (Cs) may be that of either a single-radius profile or a multi-radius profile, and is preferred to be set in a range of 20~50 mm.

Inclined curve (Cs) of the present embodiment makes a smooth inclination from tread edge (2t) toward middle land section (4b) while gradually decreasing angle ($\alpha 7$) relative to a tire circumferential direction. Such a structure made by shoulder lug groove (5a), shoulder linked sipe (6a) and middle lug groove (5b) provides a continuous drainage channel from the middle land-section (4b) side toward tread edge (2t), and contributes to enhancing drainage capability effectively. Especially, since both shoulder lug groove (5a) and middle lug groove (5b) have a greater groove width and are formed on the same inclined curve (Cs), drainage capability is effectively enhanced.

Angle ($\alpha 7$) of inclined curve (Cs) may be set appropriately. A smaller angle ($\alpha 7$) of inclined curve (Cs) causes the inclination of inclined curve (Cs) to be steep, increasing the tire circumferential range occupied by shoulder lug groove (5a), shoulder linked sipe (6a) and middle lug groove (5b). Accordingly, the rigidity of shoulder land section (4a) and middle land section (4b) may be lowered. Thus, angle ($\alpha 7$) of inclined curve (Cs) is preferred to be 50~90 degrees.

As shown in FIG. 1, middle linked sipe (6b) connects center main groove (3b) and tire axial inner end (5bi) of middle lug groove (5b). Such a structure of middle linked sipe (6b) and middle lug groove (5b) connects shoulder main groove (3a) and center main groove (3b), and contributes to discharging water between tread 2 and the ground surface away from the center main-groove (3b) side toward shoulder main groove (3a). Accordingly, drainage capability is enhanced while the tire maintains the land rigidity of middle land section (4b). To effectively exhibit such effects, depth (D4b) (shown in FIG. 3) of middle linked sipe (6b) is preferred to be 20%~60% of groove depth (D1b) (shown in FIG. 2) of center main groove (3b).

Middle linked sipe (6b) of the present embodiment is inclined in a direction opposite that of inclined curve (Cs) as shown in FIG. 4. Accordingly, an approximate V-shape is formed in middle land section (4b) to connect shoulder main groove (3a) and center main groove (3b). Such a structure of middle linked sipe (6b) contributes to setting directions of deformation of middle land section (4b) to be different on the middle linked sipe (6b) side and on the middle lug-groove (5b) side at the time of braking and driving. Accordingly, middle land section (4b) is prevented from entirely collapsing, and middle land section (4b), where the contact-patch pressure is greater than on shoulder land section (4a), exhibits greater rigidity and contributes effectively to enhancing steering stability.

As described, because shoulder lug groove (5a), shoulder linked sipe (6a) and middle lug groove (5b) are formed on inclined curve (Cs) and because middle linked sipe (6b) inclines in a direction opposite the direction of inclined curve (Cs), tire 1 of the present embodiment is capable of smoothly discharging water while increasing the rigidity of shoulder land section (4a) and middle land section (4b). Accordingly, tire 1 of the present embodiment exhibits a highly balanced enhancement of steering stability and drainage capability.

Angle ($\alpha 8$) made by middle lug groove (5b) and middle linked sipe (6b) may be set appropriately. A greater angle ($\alpha 8$) may fail to set directions of deformation of middle land section (4b) to be different enough on the middle linked-sipe (6b) side and on the middle lug-groove (5b) side. Thus, steering stability may not be improved. On the other hand, a smaller angle ($\alpha 8$) causes middle linked sipe (6b) and middle lug groove (5b) to bend sharply, and middle land section (4b) may deform significantly as a result. Accordingly, steering stability may not be improved sufficiently.

From those viewpoints, angle ($\alpha 8$) is preferred to be at least 85 degrees and no greater than 95 degrees.

As shown in FIG. 1, middle auxiliary sipe (7b) extends from shoulder main groove (3a) in a tire axially inward direction and terminates without reaching center main groove (3b). Such a structure of middle auxiliary sipe (7b) contributes to discharging water away from between tread 2 and the ground surface while preventing a decrease in the land rigidity of middle land section (4b). Accordingly, drainage capability is enhanced.

To effectively exhibit the above effects, middle auxiliary sipe (7b) is preferred to incline at the same angle as that of middle lug groove (5b). Moreover, tire axial length (L5b) of middle auxiliary sipe (7b) is preferred to be smaller than length (L3b) of middle lug groove (5b). Such a setting prevents a decrease in the rigidity of middle land section (4b), where the contact-patch pressure is greater than on shoulder land section (4a), and contributes to enhancing steering stability. Here, the depth (not shown) of middle auxiliary sipe (7b) is preferred to be approximately the same as depth (D4b) (shown in FIG. 3) of middle linked sipe (6b).

As shown in FIG. 1, center land section (4c) is provided with center lug groove (5c) and center sipe (6c). Tire axial length (L2c) of center land section (4c) is set at approximately 7%~12% of tread contact-patch width (TW).

Center lug groove (5c) extends from center main groove (3b) in a tire axially inward direction and terminates without reaching tire equator (C). Adjacent center lug grooves (5c) with tire equator (C) sandwiched in between are alternately formed in a tire circumferential direction. Because of center lug grooves (5c), center land section (4c) is formed in a rib pattern having a greater land rigidity and contributes to enhancing steering stability.

Figure 5:
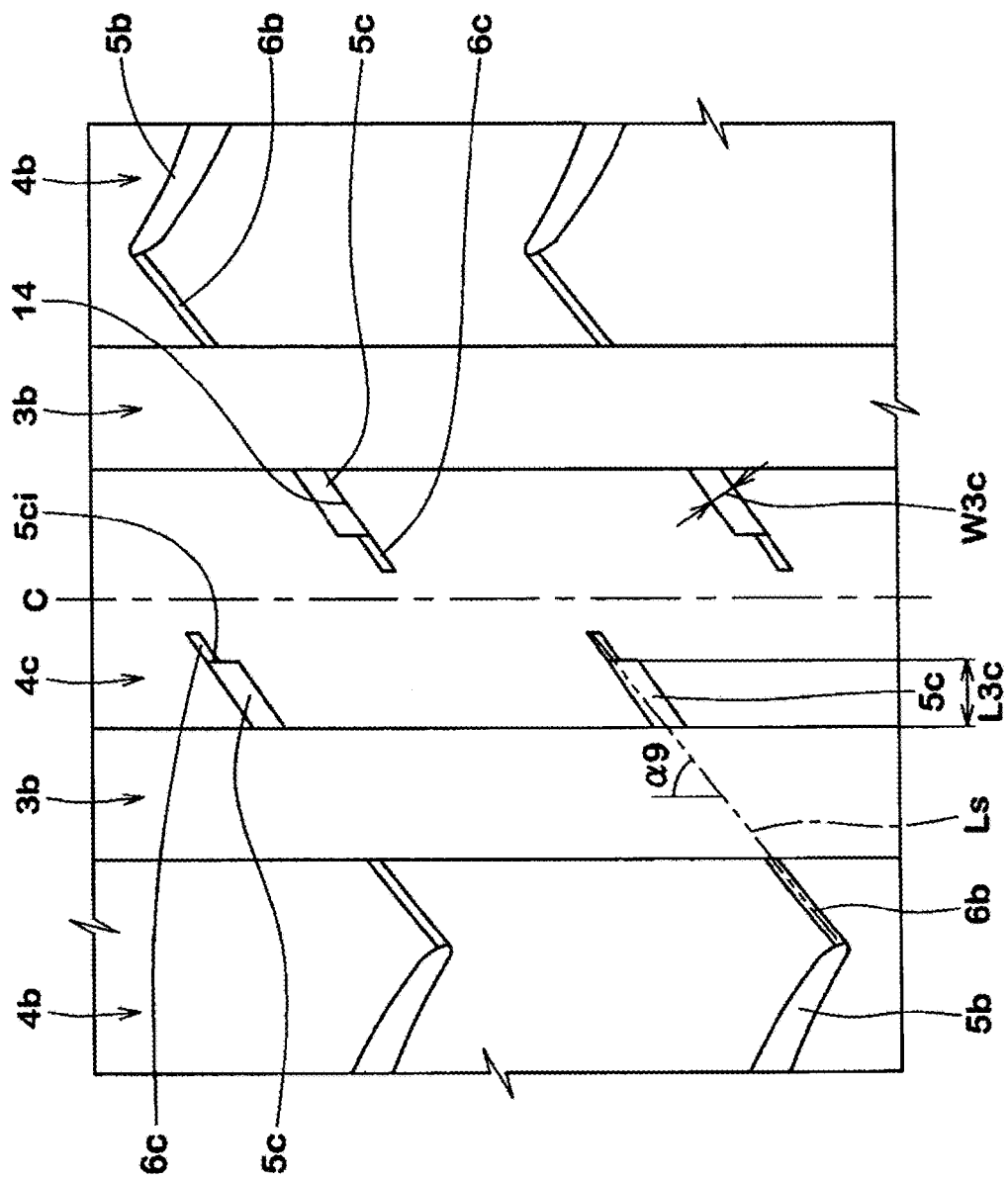
FIG. 5 is an enlarged view of a center land section in FIG. 1.

FIG. 5 is an enlarged view of center land section (4c) in FIG. 1. FIG. 6 is an enlarged view of center land section (4c) in FIG. 2. Center lug groove (5c) extends while inclining relative to a tire circumferential direction. Such a structure of center lug groove (5c) smoothly discharges water between tread 2 and the ground surface toward the center main-grove (3b) side and thus contributes to enhancing drainage capability. Here, groove width (W3c) of center lug groove (5c) is preferred to be approximately 1%~2% of tread contact-patch width (TW) (shown in FIG. 1). Groove depth (D3c) (shown in FIG. 6) of center lug groove (5c) is preferred to be approximately 3.5~5.0 mm.

Tire axial length (L3c) of center lug groove (5c) may be set appropriately. A greater length (L3c) of center lug groove (5c) fails to increase the land rigidity of center land section (4c), and steering stability may not be enhanced well. On the other hand, a shorter length (L3c) of center lug groove (5c) fails to smoothly discharge water away from between tread 2 and the ground surface, and drainage capability may not be enhanced well. From those viewpoints, length (L3c) of center lug groove (5c) is preferred to be no greater than 35% and to be at least 25% of length (L2c) (shown in FIG. 1) of center land section (4c).

Center lug groove (5c) and middle linked sipe (6b) of the present embodiment are formed on an inclined straight line (Ls) extending from inner end (5bi) of middle lug groove (5b) in a tire axially inward direction. Such a structure made by center lug groove (5c) and middle linked sipe (6b) provides a continuous drainage channel from the center land-section (4c) side toward middle land section (4b), and contributes to effectively enhancing drainage capability. Angle ($\alpha 9$) of inclined straight line (Ls) is preferred to be set approximately 30~60 degrees considering the same concerns as in inclined curve (Cs).

As shown in FIG. 5, center sipe (6c) extends from tire axially inner end (5ci) of center lug groove (5c) in a tire axially inward direction and terminates without reaching tire equator (C). Center sipe (6c) of the present embodiment extends while inclining along a circumferential groove periphery 14 of center lug groove (5c).

Such a structure of center sipe (6c) contributes to discharging water between tread 2 and the ground surface away from the tire-equator (C) side toward tread edge (2t) while maintaining the rigidity of center land section (4c). Accordingly, drainage capability is enhanced. To effectively exhibit such effects, depth (D4c) of center sipe (6c) is preferred to be approximately 50%~80% of groove depth (D3c) of center lug groove (5c) as shown in FIG. 6.

As shown in FIG. 5, center sipe (6c) is preferred to be formed on inclined straight line (Ls). Such a setting of center sipe (6c) together with center lug groove (5c) and middle linked sipe (6b) provides a continuous drainage channel formed from the center land-section (4c) side toward middle land section (4b). Accordingly, drainage capability is effectively enhanced.

Tire 1 of the present embodiment above is shown to have, for example, center land section (4c) positioned between a pair of center main grooves (3b, 3b). However, tire 1 is not limited to such a structure. For example, a tire may be structured to have a single center main groove (3b) formed on tire equator (C) but not to have a center land section (4c) (not shown). Such a structure of a tire 1 can also discharge water smoothly away from between tread 2 and the ground surface while enhancing the rigidity of shoulder land section (4a) and middle land section (4b). Accordingly, such a tire 1 also exhibits a highly balanced enhancement of steering stability and drainage capability.

So far, embodiments of the present invention have been described in detail. However, the present invention is not limited to those shown in the drawings, and various modifications are possible for carrying out the present invention.

EXAMPLES

Tires were prepared to have the basic patterns shown in FIG. 1 and to have shoulder lug grooves, middle lug groove, center lug grooves, shoulder linked sipes, middle linked sipes and center sipes as specified in Table 1. The test tires were evaluated as described below.

Figure 7A:
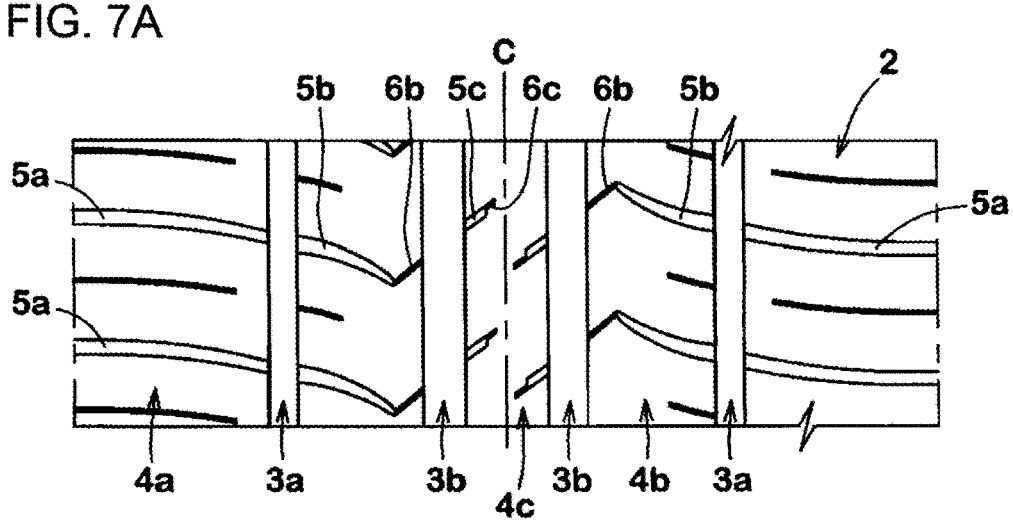
FIG. 7A is a developed view of a pneumatic tire of Comparative Example 1.
Figure 7B:
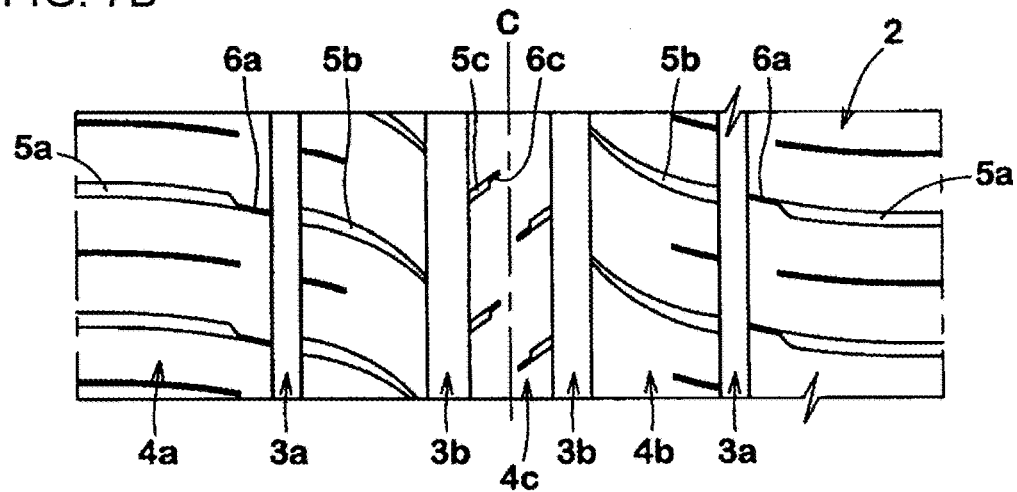
FIG. 7B is a developed view of a pneumatic tire of Comparative Example 2.
Figure 7C:
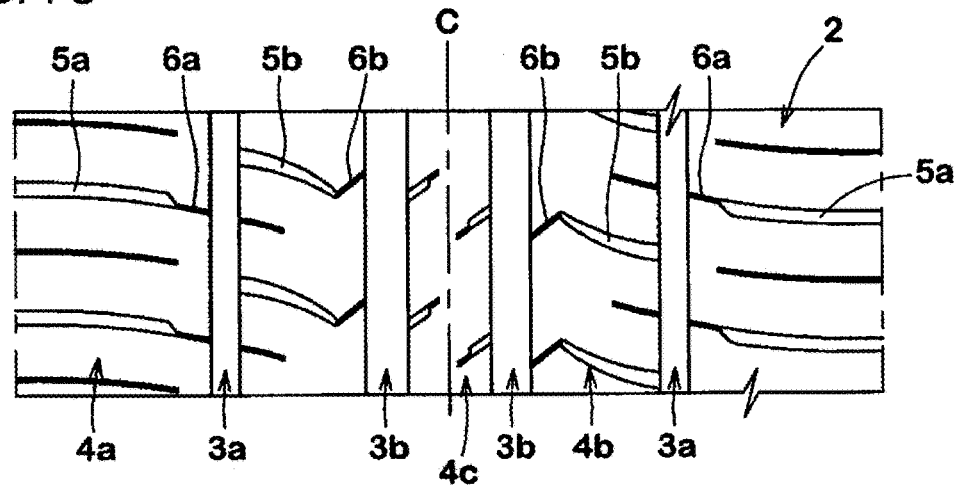
FIG. 7C is a developed view of a pneumatic tire of Comparative Example 3.

In addition, for comparison purposes, a tire (Comparative Example 1) was prepared to have shoulder lug grooves that completely cross through the shoulder land section as shown in FIG. 7A; a tire (Comparative Example 2) was prepared to have middle lug grooves that completely cross through the middle land section as shown in FIG. 7B; and a tire (Comparative Example 3) was prepared to have a shoulder lug groove, a shoulder linked sipe and a middle lug groove that are not formed on the same inclined curve as shown in FIG. 7C. Comparative Example 1~3 were also evaluated the same as the examples. The specifications common to all the tires are as follows:
  tire size: 195/65R15, 91H
  rim size: 6.0J×15
  inflation pressure: 180 kPa
  vehicle: domestic FF car (1500cc)
  tread contact-patch width TW: 135 mm
  shoulder main groove:
    groove width W1a/TW: 3.8%
    groove depth D1a: 7.0 mm
  center main groove:
    groove width W1b/TW: 4.8%
    groove depth D1b: 7.0 mm angle (α1) of chamfered corner: 45 degrees
length of shoulder land section L2a/TW: 23.8%
shoulder lug groove:
groove width W3a/TW: 2%
groove depth D3a: 6.7 mm
depth of shoulder linked sipe D4a/D1a: 70%
length of middle land section L2b/TW: 13.3%
depth of middle linked sipe D4b/D1b: 30%
length of center land section L2c/TW: 8.7%
center lug groove:
groove width W3c/TW: 1.2%
groove depth D3c: 4 0 mm
angle (α9) of inclined straight line: 45 degrees
depth of center sipe D4c/D3c: 60%
curvature radius of inclined curve Cs: 32 mm 1 at 100. The greater the value is, the better is the drainage capability. A value of 100 or greater indicates sufficient drainage capability.

Steering Stability

Test tires are each mounted on the above rim, filled with the above-specified inflation pressure, and mounted on the four wheels of the above vehicle. The vehicle was driven with two people on board on a dry-asphalt test course. The driver conducted sensory evaluation of tire characteristics such as responsiveness of the steering wheel, feel of rigidity and grip. The evaluation results are shown in ratings by setting the result obtained in Example 2 at 100. The greater the value is, the better is the steering stability. A value of 100 or greater indicates sufficient steering stability. Test results are shown in Table 1.

TABLE 1

| Developed View of Tread | Examp. 1 FIG. 1 | Examp. 2 FIG. 1 | Examp. 3 FIG. 1 | Examp. 4 FIG. 1 | Examp. 5 FIG. 1 | Examp. 6 FIG. 1 | Examp. 7 FIG. 1 | Comp. Examp. 1 FIG. 7A | Comp. Examp. 2 FIG. 7B | Comp. Examp. 3 FIG. 7C | Examp. 8 FIG. 1 | Examp. 9 FIG. 1 | Examp. 10 FIG. 1 |
|---|---|---|---|---|---|---|---|---|---|---|---|---|---|
| Ratio of Length (L3a) of Shoulder Lug Groove to Length (L2a) of Shoulder Land Section: L3a/L2a (%) | 70 | 80 | 80 | 80 | 80 | 80 | 80 | 100 | 80 | 80 | 80 | 80 | 80 |
| Groove Width (W6b) of Middle Lug Groove on Inner-End Side (mm) | 5.2 | 5.2 | 2.7 | 2.7 | 2.7 | 2.7 | 2.7 | 2.7 | 2.7 | 2.7 | 2.7 | 2.7 | 2.7 |
| Groove Width (W6a) of Middle Lug Groove on Shoulder Main-Groove Side (mm) | 5.2 | 5.2 | 7.7 | 7.7 | 7.7 | 7.7 | 7.7 | 7.7 | 7.7 | 7.7 | 7.7 | 7.7 | 7.7 |
| W6b/W6a (%) | 100 | 100 | 35 | 35 | 35 | 35 | 35 | 35 | 35 | 35 | 35 | 35 | 35 |
| Groove Depth (D6b) of Middle Lug Groove on Inner-End Side (mm) | 4.5 | 4.5 | 4.5 | 2.8 | 2.8 | 2.8 | 2.8 | 2.8 | 2.8 | 2.8 | 2.8 | 2.8 | 2.8 |
| Groove Depth (D6a) of Middle Lug Groove on Shoulder Main-Groove Side (mm) | 4.5 | 4.5 | 4.5 | 6.8 | 6.8 | 6.8 | 6.8 | 6.8 | 6.8 | 6.8 | 6.8 | 6.8 | 6.8 |
| D6b/D6a (%) | 100 | 100 | 100 | 41 | 41 | 41 | 41 | 41 | 41 | 41 | 41 | 41 | 41 |
| Angle (a8) Made by Middle Lug Groove and Middle Joint Sipe (deg) | 110 | 110 | 110 | 110 | 70 | 90 | 90 | 90 | — | 90 | 90 | 90 | 90 |
| Angle (a3) of Inner Groove Wall (deg) | 15 | 15 | 15 | 15 | 15 | 15 | 35 | 35 | 35 | 35 | 35 | 35 | 35 |
| Ratio of Length (L3b) of Middle Lug Groove to Length (L2b) of Middle Land Section: L3b/L2b (%) | 80 | 80 | 80 | 80 | 80 | 80 | 80 | 80 | 100 | 80 | 70 | 75 | 85 |
| Drainage Capability (index) | 100 | 103 | 105 | 106 | 106 | 106 | 106 | 110 | 105 | 94 | 101 | 104 | 107 |
| Steering Stability (rating) | 101 | 100 | 100 | 100 | 101 | 103 | 104 | 90 | 90 | 100 | 101 | 103 | 100 |

Drainage Capability

Test tires were each mounted on the above rim, filled with the above-specified inflation pressure, and mounted on the four wheels of the above vehicle. The vehicle was brought onto a test course of an asphalt road surface with a radius of 102 m where a 20 m-long and 6 mm-deep puddle was formed. The speed of the vehicle was increased incrementally to measure lateral acceleration speeds (lateral G). Then, average values of lateral G at the front wheels were measured at a speed of 60 km/h to 90 km/h. The results are shown in indices by setting the value obtained in Example Test results show the tires of the examples are confirmed to exhibit highly enhanced steering stability and drainage capability.

A pneumatic tire may have a tread provided with land sections bordered by multiple main grooves each continuously extending in a tire circumferential direction. Land sections are set to have lateral grooves extending in a direction to cross main grooves. Such a structure of lateral grooves contributes to discharging water between the land sections and the ground surface away from the tire.

To enhance the drainage capability of a pneumatic tire, it is an option to form lateral grooves that completely cross through lateral sections or to increase the groove volume of lateral grooves. However, such an option tends to decrease steering stability because of lowered rigidity in the land sections.

A pneumatic tire according to an embodiment of the present invention exhibits a highly balanced enhancement of steering stability and drainage capability.

A pneumatic tire according to an embodiment of the present invention is characterized by having the following on its tread: a shoulder main groove positioned closest to a tread edge and extending continuously in a tire circumferential direction; a center main groove positioned adjacent to the shoulder main groove on the tire axially inner side and extending continuously in a tire circumferential direction; a shoulder land section positioned on the tire axially outer side of the shoulder main groove; and a middle land section bordered by the shoulder main groove and the center main groove. The shoulder land section is provided with a shoulder lug groove extending from the tread edge in a tire axially inward direction to terminate without reaching the shoulder main groove, along with a shoulder linked sipe connecting the tire axially inner end of the shoulder lug groove and the shoulder main groove. The middle land section is provided with a middle lug groove extending from the shoulder main groove in a tire axially inward direction to terminate without reaching the center main groove, along with a middle linked sipe connecting the tire axially inner end of the middle lug groove and the center main groove. The shoulder lug groove, the shoulder linked sipe and the middle lug groove are formed on an inclined curve extending smoothly from the tread edge in a tire axially inward direction, and the middle linked sipe inclines in a direction opposite the direction of the inclined curve.

In a pneumatic tire according to an embodiment of the present invention, the tire axial length of the shoulder lug groove is preferred to be 75%~85% of the tire axial length of the shoulder land section.

In a pneumatic tire according to an embodiment of the present invention, the groove width of the middle lug groove is preferred to increase gradually from the inner end toward the shoulder main groove.

In a pneumatic tire according to an embodiment of the present invention, the groove depth of the middle lug groove is preferred to increase gradually from the inner end toward the shoulder main groove.

In a pneumatic tire according to an embodiment of the present invention, the angle made by the middle lug groove and the middle linked sipe is preferred to be 85~95 degrees.

In a pneumatic tire according to an embodiment of the present invention, in a cross-sectional view of the shoulder lug groove seen along the groove center line, an inner groove wall is preferred to be formed on the inner-end side of the shoulder lug groove to connect the groove bottom of the shoulder lug groove and the contact patch of the tread. The angle of the inner groove wall is preferred to be 30~40 degrees relative to the tread normal line perpendicular to the contact patch.

In a pneumatic tire according to an embodiment of the present invention, it is preferred that one center main groove be formed on each of both sides of the tire equator and a center land section be bordered by the center main grooves. The center land section is preferred to be provided with a center lug groove extending from a center middle groove in a tire axially inward direction to terminate without reaching the tire equator.

In a pneumatic tire according to an embodiment of the present invention, the center lug groove and the middle linked sipe are preferred to be positioned on an inclined straight line extending from the inner end of the middle lug groove in a tire axially inward direction.

In a pneumatic tire according to an embodiment of the present invention, the center land section is preferred to be further provided with a center sipe extending from the tire axially inner end of the center lug groove in a tire axially inward direction to terminate without reaching the tire equator, and the center sipe is preferred to be positioned on the inclined straight line.

A pneumatic tire according to an embodiment of the present invention has a tread provided with a shoulder land section on the tire axially outer side of a shoulder main groove, along with a middle land section bordered by a shoulder main groove and a center main groove.

The shoulder land section has a shoulder lug groove that extends from the tread edge in a tire axially inward direction to terminate without reaching the shoulder main groove, and a shoulder linked sipe that connects the tire axially inner end of the shoulder lug groove and the shoulder main groove. Accordingly, the shoulder land section is formed in a rib pattern with greater land rigidity, and steering stability is thereby enhanced.

In addition, the tread edge and the shoulder main groove are connected to each other by the shoulder lug groove and the shoulder linked sipe.

The middle land section is provided with a middle lug groove that extends from the shoulder main groove in a tire axially inward direction to terminate without reaching the center main groove, and a middle linked sipe that connects the tire axially inner end of the middle lug groove and the center main groove. By so setting, the middle land section is formed in a rib pattern having greater land rigidity, thus enhancing steering stability. In addition, since the shoulder main groove and center main groove are connected by the middle lug groove and the middle linked sipe, drainage capability is enhanced.

The shoulder lug groove, shoulder linked sipe and middle lug groove are positioned on an inclined curve extending smoothly from the tread edge in a tire axially inward direction. Such a structure of the shoulder lug groove, shoulder linked sipe and middle lug groove create a drainage channel that extends continuously along the inclined curve from the middle land-section side toward the tread edge. Accordingly, the drainage capability is effectively enhanced.

The middle linked sipe inclines in a direction opposite that of the inclined curve above. Such a structure of the middle linked sipe contributes to setting directions of deformation of the middle land section to be different on the middle linked-sipe side and on the middle lug-groove side at the time of braking and driving, thereby preventing a collapse of the entire middle land section. Thus, rigidity is enhanced in the middle land section, where the contact-patch pressure is greater than in the shoulder land section, and steering stability is effectively enhanced.

As described, a pneumatic tire according to an embodiment of the present invention enhances rigidity in the shoulder land section and middle land section while smoothly discharging water away from the tire. Accordingly, the tire exhibits a highly balanced enhancement of steering stability and drainage capability.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:

a tread having a shoulder main groove formed closest to a tread edge and extending continuously in a tire circumferential direction, a center main groove formed adjacent to the shoulder main groove on a tire axially inner side and extending continuously in the tire circumferential direction, a shoulder land section formed on a tire axially outer side of the shoulder main groove, and a middle land section bordered by the shoulder main groove and the center main groove, wherein the shoulder land section has a shoulder lug groove extending from the tread edge in a tire axially inward direction and terminating at a tire axially inner end without reaching the shoulder main groove, and a shoulder linked sipe connecting the tire axially inner end of the shoulder lug groove and the shoulder main groove, the middle land section has a middle lug groove extending from the shoulder main groove in the tire axially inward direction and terminating at a tire axially inner end without reaching the center main groove, and a middle linked sipe connecting the tire axially inner end of the middle lug groove and the center main groove, the shoulder lug groove, the shoulder linked sipe and the middle lug groove are formed on an inclined curve extending smoothly from the tread edge in the tire axially inward direction, the middle linked sipe is formed such that the middle linked sipe is inclining in a direction opposite with respect to the inclined curve, the center main groove is formed in a plurality such that the plurality of center main grooves is formed on both sides of a tire equator, respectively, the tread has a center land section bordered by the center main grooves, the center land section has a center lug groove extending from one of the center main grooves in the tire axially inward direction and terminating without reaching the tire equator, and the center lug groove and the middle linked sipe are formed on an inclined straight line extending from the tire axially inner end of the middle lug groove in the tire axially inward direction.

2. The pneumatic tire according to claim 1, wherein the shoulder lug groove has a tire axial length set in a range of 75% to 85% of a tire axial length of the shoulder land section.

3. The pneumatic tire according to claim 2, wherein the middle lug groove has a groove width which is increasing gradually from the tire axially inner end of the middle lug groove toward the shoulder main groove.

4. The pneumatic tire according to claim 2, wherein the middle lug groove has a groove depth which is increasing gradually from the tire axially inner end of the middle lug groove toward the shoulder main groove.

5. The pneumatic tire according to claim 2, wherein the middle lug groove and the middle linked sipe form an angle set in a range of 85 degree to 95 degrees.

6. The pneumatic tire according to claim 2, wherein the shoulder lug groove has a cross section along a groove center line such that an inner groove wall is formed on an inner-end side of the shoulder lug groove and connecting a groove bottom of the shoulder lug groove and a contact patch of the tread, and the angle of the inner groove wall has an angle set in a range of 30 degree to 40 degrees relative to a tread normal line perpendicular to the contact patch.

7. The pneumatic tire according to claim 2, wherein the center land section has a center sipe extending from the tire axially inner end of the center lug groove in the tire axially inward direction and terminating without reaching the tire equator, and the center sipe is formed on the inclined straight line.

8. The pneumatic tire according to claim 1, wherein the middle lug groove has a groove width which is increasing gradually from the tire axially inner end of the middle lug groove toward the shoulder main groove.

9. The pneumatic tire according to claim 8, wherein the middle lug groove has a groove depth which is increasing gradually from the tire axially inner end of the middle lug groove toward the shoulder main groove.

10. The pneumatic tire according to claim 8, wherein the middle lug groove and the middle linked sipe form an angle set in a range of 85 degree to 95 degrees.

11. The pneumatic tire according to claim 8, wherein the shoulder lug groove has a cross section along a groove center line such that an inner groove wall is formed on an inner-end side of the shoulder lug groove and connecting a groove bottom of the shoulder lug groove and a contact patch of the tread, and the angle of the inner groove wall has an angle set in a range of 30 degree to 40 degrees relative to a tread normal line perpendicular to the contact patch.

12. The pneumatic tire according to claim 8, wherein center land section has a center sipe extending from the tire axially inner end of the center lug groove in the tire axially inward direction and terminating without reaching the tire equator, and the center sipe is formed on the inclined straight line.

13. The pneumatic tire according to claim 1, wherein the middle lug groove has a groove depth which is increasing gradually from the tire axially inner end of the middle lug groove toward the shoulder main groove.

14. The pneumatic tire according to claim 13, wherein the middle lug groove and the middle linked sipe form an angle set in a range of 85 degree to 95 degrees.

15. The pneumatic tire according to claim 13, wherein the shoulder lug groove has a cross section along a groove center line such that an inner groove wall is formed on an inner-end side of the shoulder lug groove and connecting a groove bottom of the shoulder lug groove and a contact patch of the tread, and the angle of the inner groove wall has an angle set in a range of 30 degree to 40 degrees relative to a tread normal line perpendicular to the contact patch.

16. The pneumatic tire according to claim 13, wherein the center land section has a center sipe extending from the tire axially inner end of the center lug groove in the tire axially inward direction and terminating without reaching the tire equator, and the center sipe is formed on the inclined straight line.

17. The pneumatic tire according to claim 1, wherein the middle lug groove and the middle linked sipe form an angle set in a range of 85 degree to 95 degrees.

18. The pneumatic tire according to claim 17, wherein the shoulder lug groove has a cross section along a groove center line such that an inner groove wall is formed on an inner-end side of the shoulder lug groove and connecting a groove bottom of the shoulder lug groove and a contact patch of the tread, and the angle of the inner groove wall has an angle set in a range of 30 degree to 40 degrees relative to a tread normal line perpendicular to the contact patch.

19. The pneumatic tire according to claim 1, wherein the shoulder lug groove has a cross section along a groove center line such that an inner groove wall is formed on an inner-end side of the shoulder lug groove and connecting a groove bottom of the shoulder lug groove and a contact patch of the tread, and the angle of the inner groove wall has an angle set in a range of 30 degree to 40 degrees relative to a tread normal line perpendicular to the contact patch.

20. The pneumatic tire according to claim 1, wherein the center land section has a center sipe extending from the tire axially inner end of the center lug groove in the tire axially inward direction and terminating without reaching the tire equator, and the center sipe is formed on the inclined straight line.

* * * * *